(12) United States Patent
Winnike et al.

(10) Patent No.: US 7,284,986 B2
(45) Date of Patent: Oct. 23, 2007

(54) MEDICAL TRAINING AID HAVING INFLATABLE AIRWAYS

(75) Inventors: Harold Benedict Winnike, West Point, IA (US); Anne Louise Meng, League City, TX (US); Susan Winterroth McConnell, Galveston, TX (US); Randall M. Goldblum, Dickinson, TX (US); Nanette Eugenie Jay, Galveston, TX (US); Regina Burdett, League City, TX (US); Edward Gautier Brooks, Galveston, TX (US); Lynda Marie Williams, Dickinson, TX (US); Katherine L. Miller, Aspen, CO (US)

(73) Assignee: Legacy Products, Inc., Cambridge City, IN (US)

( * ) Notice: Subject to any disclaimer, the term of this patent is extended or adjusted under 35 U.S.C. 154(b) by 157 days.

(21) Appl. No.: 11/265,615

(22) Filed: Nov. 2, 2005

(65) Prior Publication Data

US 2006/0121430 A1 Jun. 8, 2006

Related U.S. Application Data

(60) Provisional application No. 60/624,213, filed on Nov. 2, 2004.

(51) Int. Cl.
*G09B 23/28* (2006.01)
(52) U.S. Cl. .................... 434/267; 434/262
(58) Field of Classification Search ............... 434/262, 434/267, 268, 272; 446/295
See application file for complete search history.

(56) References Cited

U.S. PATENT DOCUMENTS

| | | | | | |
|---|---|---|---|---|---|
| 2,678,505 | A | * | 5/1954 | Munson | 434/272 |
| 3,154,881 | A | * | 11/1964 | Elwell | 446/24 |
| 4,087,933 | A | * | 5/1978 | Strongin | 446/183 |
| 4,288,222 | A | * | 9/1981 | Kling | 434/272 |
| 4,822,285 | A | * | 4/1989 | Summerville | 434/272 |
| 5,286,206 | A | * | 2/1994 | Epstein et al. | 434/265 |
| 5,312,259 | A | * | 5/1994 | Flynn | 434/265 |
| 5,314,339 | A | * | 5/1994 | Aponte | 434/267 |
| 5,356,295 | A | * | 10/1994 | Grosz | 434/267 |
| 5,411,437 | A | * | 5/1995 | Weber et al. | 434/269 |
| 5,779,484 | A | * | 7/1998 | Lampotang et al. | 434/266 |
| 5,795,157 | A | | 8/1998 | Weber et al. | |
| 5,823,787 | A | * | 10/1998 | Gonzalez et al. | 434/265 |
| 5,853,293 | A | | 12/1998 | Weber et al. | |
| 6,004,136 | A | * | 12/1999 | Ehrenpreis | 434/262 |
| 6,159,017 | A | * | 12/2000 | Coomansingh | 434/267 |
| 6,296,490 | B1 | * | 10/2001 | Bowden | 434/265 |
| 6,500,009 | B1 | * | 12/2002 | Brault et al. | 434/265 |
| 6,780,017 | B2 | * | 8/2004 | Pastrick et al. | 434/265 |
| 6,910,896 | B1 | * | 6/2005 | Owens et al. | 434/267 |
| 7,083,419 | B2 | * | 8/2006 | Winslow | 434/273 |

* cited by examiner

*Primary Examiner*—Kurt Fernstrom
(74) *Attorney, Agent, or Firm*—Fraser Clemens Martin Miller LLC; Donald R. Fraser

(57) ABSTRACT

A medical training manikin having a body, a model of a lung including inflatable airways communicating with the lung model, and fastener means for selectively attaching the model of a lung to the body. The model of a lung is used to demonstrate various lung functions and ailments.

15 Claims, 5 Drawing Sheets

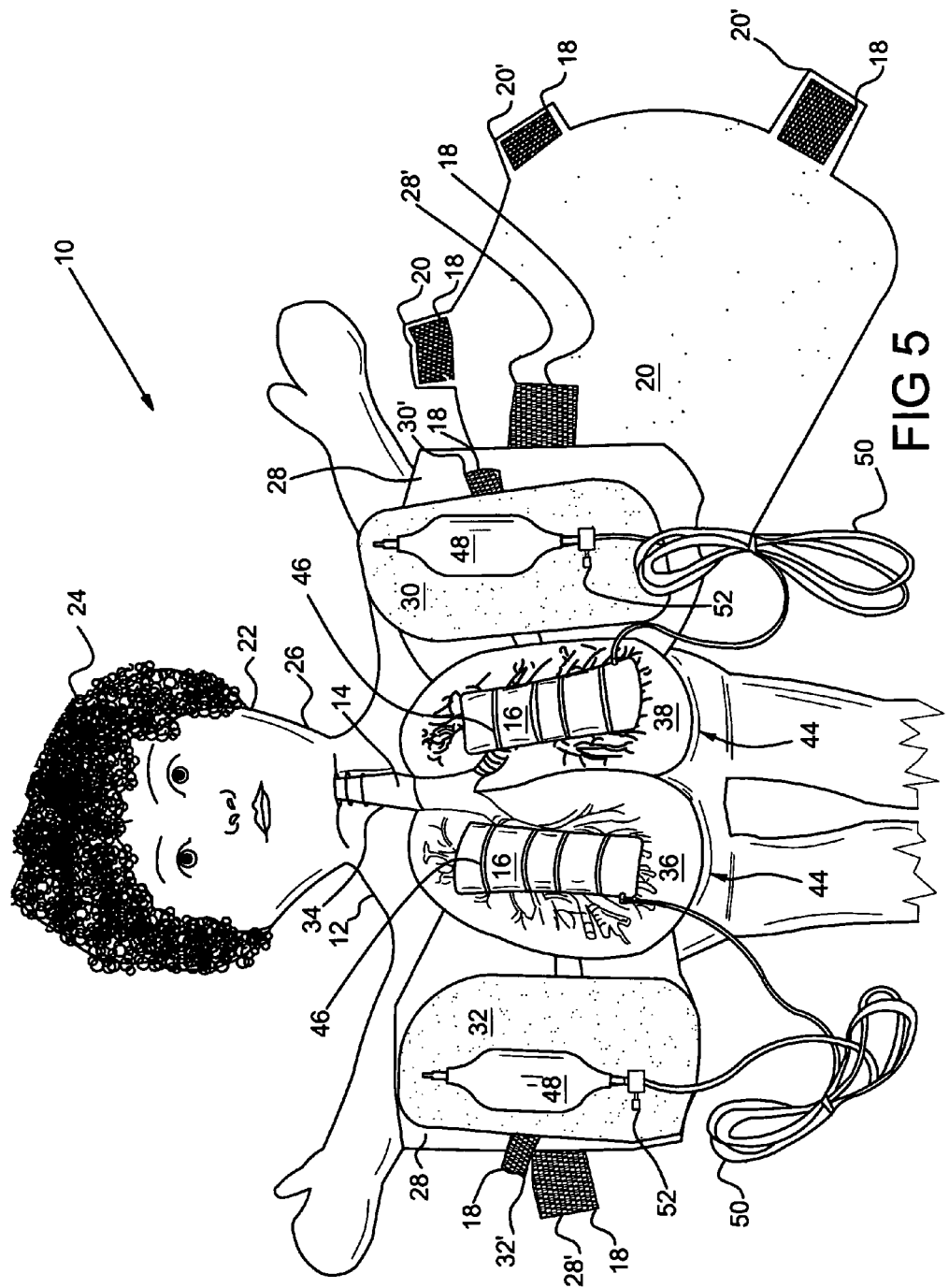

MEDICAL TRAINING AID HAVING INFLATABLE AIRWAYS

CROSS-REFERENCE TO RELATED APPLICATION

This application claims priority to U.S. Provisional Application Ser. No. 60/624,213 filed on Nov. 2, 2004, the entire disclosure of which is hereby incorporated into this disclosure in its entirety.

FIELD OF THE INVENTION

The present invention relates to medical training aids, and more particularly, to medical training aids wherein transparencies, representations, or functioning models of lungs with inflatable airways may be detachably secured to an associated manikin.

BACKGROUND OF THE INVENTION

When a patient faces surgery, the surgeon uses charts to explain the nature of the condition and the surgery to be used to correct the condition. Such explanation is often used to relieve the anxiety of the patient.

However, with some patients, for example children, the situation is quite different. The hospital is often an unknown and fearful place. The patient does not understand what is about to happen. In many cases, the patient is too young or otherwise incapable of understanding the type of charts used by a doctor to explain a condition to normal adults. Thus, those skilled in the art have searched for a readily usable and understandable way to explain to patients the medical problem, and the procedure to be followed.

One solution is to provide a life-like model of various portions of the body which can be opened to reveal the organs in question. However, these tend to be rather large, bulky, and expensive.

Another solution used to aid in explaining and enabling patients to learn about their medical conditions is a manikin made with various appliqueé and embroidery overlays. The manikin, with the aid of Velcro-type fasteners, may be opened and closed to reveal internal systems and organs enabling patients to learn about their medical conditions. Since the various flaps are permanently attached, there is no opportunity to show the changes taking place in another part of the body. Such structure limits the usefulness of such a manikin. Those skilled in the art have continued to search for the solution of how to provide a practical teaching aid.

It would be desirable to have a portable medical training manikin having at least a body torso partially covered with a fastener accepting fabric, adapted to allow the attachment of transparencies, fabric overlays, or functioning models that represent various body parts, medical conditions, and for other training purposes.

SUMMARY OF THE INVENTION

Concordant with the present invention, a portable medical training manikin having at least a soft body for attaching medical training aids. The medical training aids attached could be transparencies, fabric overlays, and functioning models that represent human lungs, cardiovascular related body parts, and various cardiovascular medical conditions. A medical training manikin having a body, a model of a lung including inflatable airways communicating with the model of a lung, and a fastening means for selectively attaching the model of a lung to the model. The model of a lung is used to demonstrate various lung functions and ailments.

In one embodiment of the present invention, the torso of a training manikin is covered with a fastener accepting fabric. A model of a lung containing inflatable airways, other organ models, or body parts are attachable to the body.

It is an object of the present invention to produce a medical training manikin for use in facilitating the explanation of medical conditions to patients and caregivers.

It is a further object of the present invention to produce a medical training manikin including a series of embroidered overlays representing various lung components and illnesses which may be removably attached.

It is a still further object of the present invention to produce a medical training manikin to which a model of lungs having inflatable airways may be removably attached thereto.

Still another object of the invention is to produce a medical training manikin which will assist in a patient understanding the nature of airway inflammation, mucus accumulation, bronchoconstriction and their relation to symptoms and medication.

BRIEF DESCRIPTION OF THE DRAWINGS

Other objects and advantages of the invention will become readily apparent to those skilled in the art from reading the following description of the invention when considered in the light of the accompanying drawings, in which:

FIG. 5 is a perspective view of the manikin showing inflatable airways removed from an interior pouch in each lung, specifically illustrating the hand-operated pumps for squeezing air into the inflatable airways.

Figure 1:
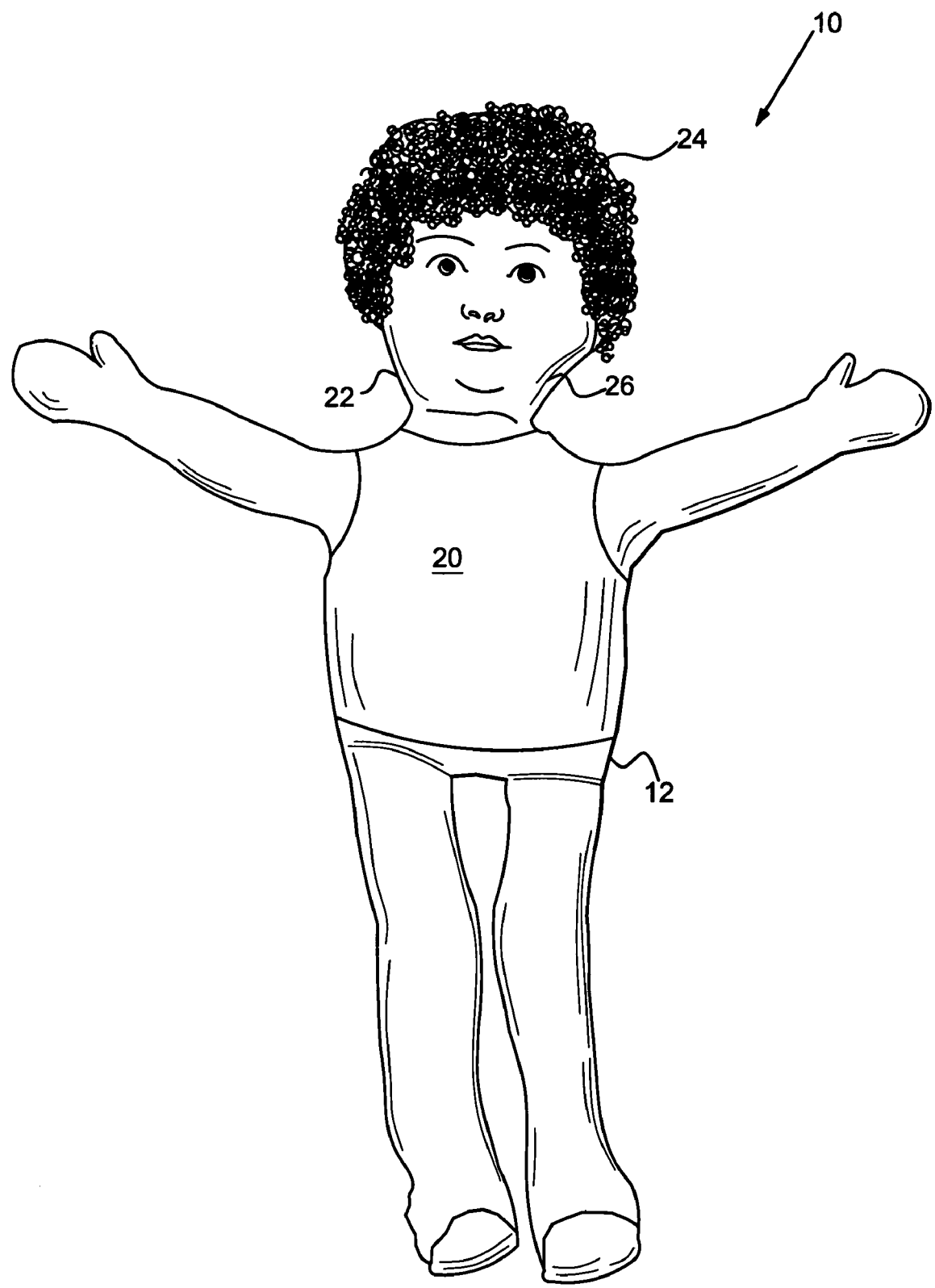
FIG. 1 is a perspective view of a manikin incorporating the present invention.

It is to be understood that the present invention is not limited in its application to the details of construction and arrangement of parts illustrated in the accompanying drawings, since the invention is capable of other embodiments, and of being practiced or carried out in various ways within the scope of the appended claims. Also, it is to be understood that the terminology employed herein is for the purpose of description, and not of limitation.

DETAILED DESCRIPTION OF PREFERRED EMBODIMENT OF THE INVENTION

Referring to the accompanying drawings, there is shown a medical training manikin adapted for easily attaching and removing transparencies, fabric overlays, appliqués, or functioning models of lungs with inflatable airways used for demonstrating various cardiovascular medical conditions to achieve the above objects.

The medical training manikin 10 comprises a body 12; a model of a lung 14 including inflatable airways 16 communicating with the model of a lung 14; and a fastener means 18 for attaching the model of a lung 14 to the body 12.

A medical training manikin 10 is illustrated in FIG. 1 including a fabric covering 20 representing human skin; a head 22; a wig 24; and a face mask 26. The fabric covering 20 includes fastener tabs 20' containing the fastener means 18 (shown in FIG. 2-5) for selectively attaching the covering 20 to the body 12. The covering 20 is used to conceal the lung model 12 (shown in FIGS. 3-5) and other body parts and is removed as necessary during the patient demonstration.

The fastener means 18 for attaching the covering 20 to the body 12 is preferably a hook and loop fastener. It will be understood that other means for attaching could be utilized, such as for example: 1) snap-type fasteners; 2) combination of hook and loop and snap-type fasteners; 3) reusable adhesive fasteners; 4) or any other suitable means for easy attachment and removal of the model of a lung 14 or other medical training aids.

The head 22 is constructed of a material adapted for detachably receiving the wig 24 and face mask 26. The wig 24 and face mask 26 are typically attached to the head 22 by the fastener means 18 (not shown) which include a hook and loop fastener attachment. The wig 24 may be any color, style, and constructed of any material suitable to represent human hair. As the medical training manikin 10 is utilized with a patient in accordance with the illustrated sequence of FIGS. 1-5, a face mask 26 with an anxious expression may be used to replace the face mask 26 of the manikin illustrated in the drawings. The face mask 26 may show any expression including happiness, sadness, concern, pain, or anger.

Figure 2:
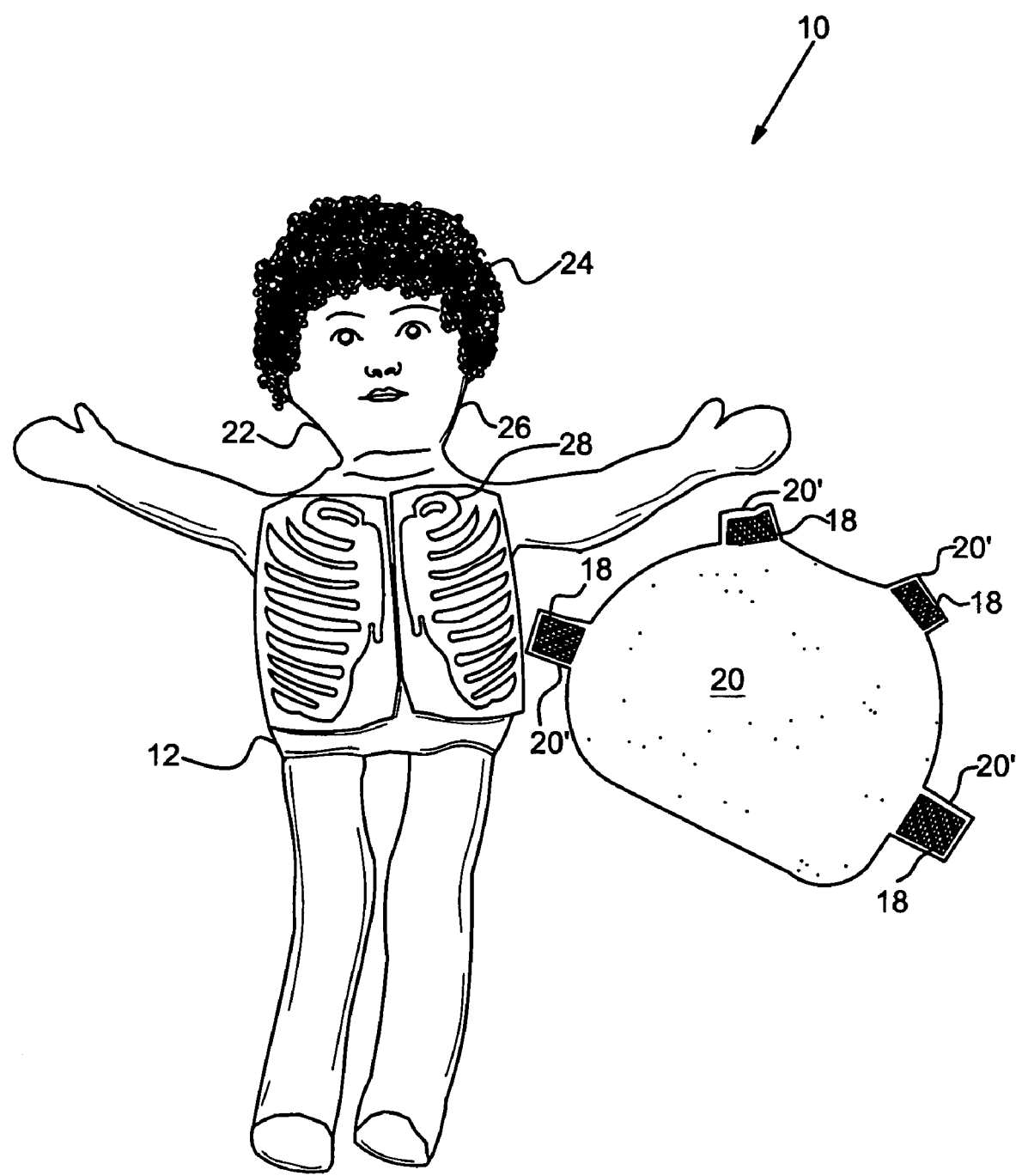
FIG. 2 is a perspective view of the manikin illustrated in FIG. 1 with a skin covering removed to reveal a rib cage covering.

FIG. 2 illustrates the medical training manikin 10 with the fabric human skin covering 20 removed to expose a fabric rib cage covering 28 representing a human rib cage. The rib cage covering 28 is selectively attached to the body 12 by fastener tabs 28' (shown in FIG. 3) that contain the fastener means 18.

Figure 3:
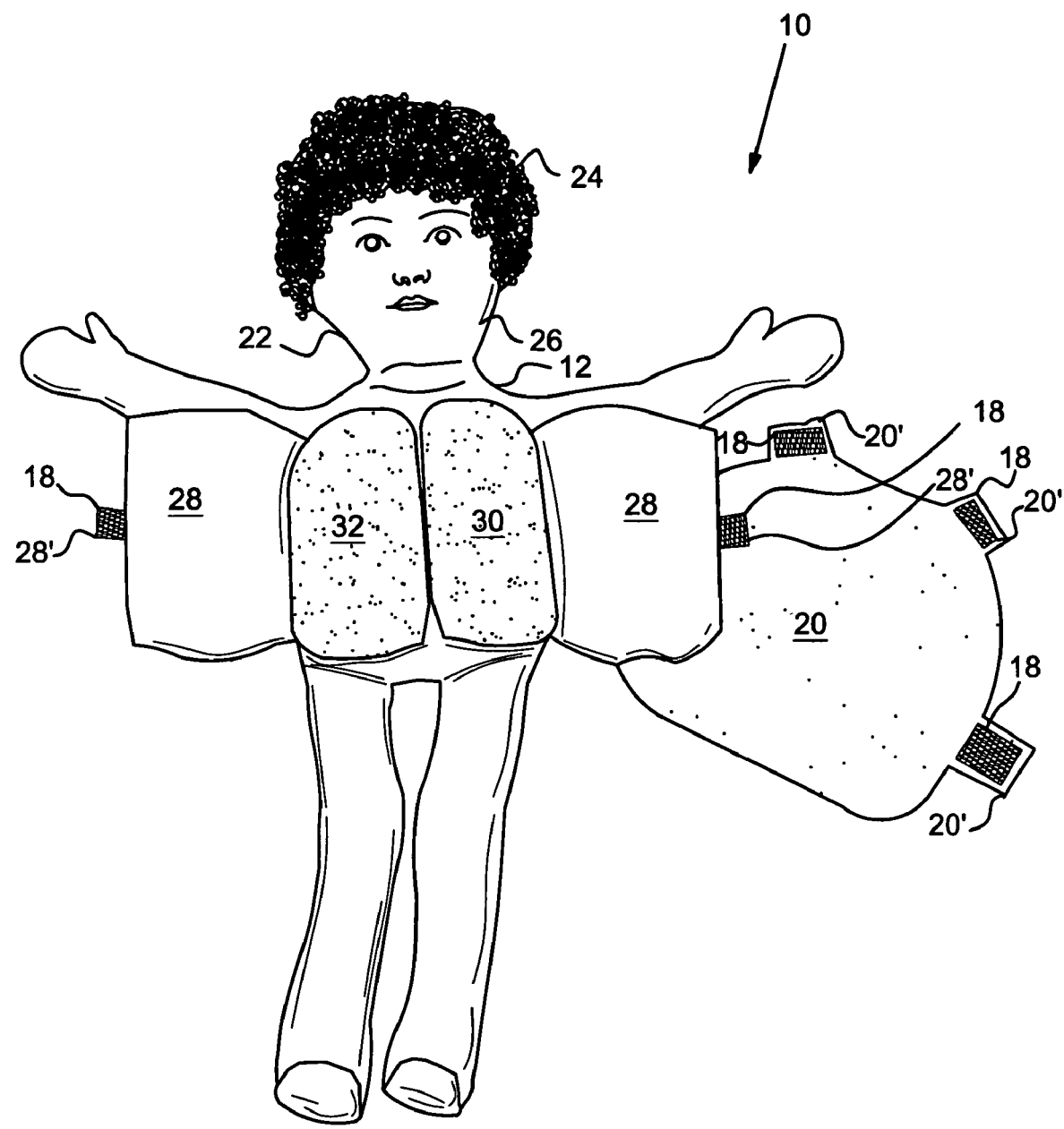
FIG. 3 is a perspective view of the manikin illustrated in FIG. 2 with the rib cage covering removed to reveal a right lung covering and a left lung covering.

FIG. 3 shows the medical training manikin 10 with the covering 20 and the rib cage covering 28 removed to expose a right lung covering 30 and a left lung covering 32 that represent the outer surface of human lungs. Both the right and left lung coverings 30, 32 are typically made of fabric. The right and left lung coverings 30, 32 include fastener tabs 30', 32' (shown in FIG. 4), respectively. The fastener tabs 30', 32' contain the fastener means 18 for selectively attaching the right and left lung coverings 30, 32 to the body 12.

Figure 4:
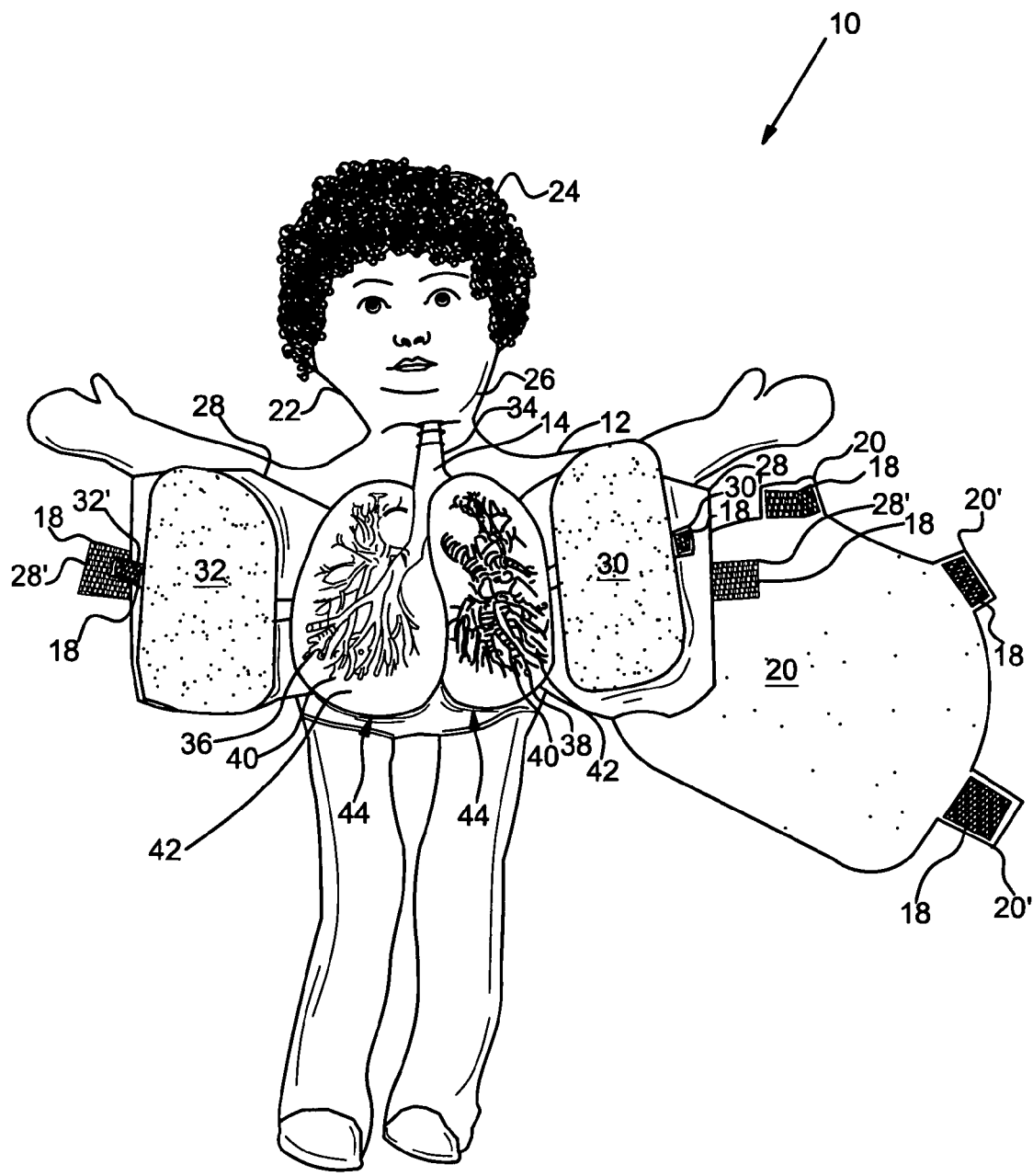
FIG. 4 is a perspective view of the manikin illustrated in FIG. 3 with the right and left lung coverings removed to reveal a healthy right lung and an unhealthy lung depicting the respective bronchia and air sacs.

FIG. 4 illustrates the medical training manikin 10 with the covering 20, the rib cage covering 28, and the right and left lung coverings 30, 32 removed to expose the model of a lung 14.

The model of a lung 14 comprises a trachea 34 and indicia representing a healthy lung 36 and an unhealthy lung 38. The healthy lung 36 and unhealthy lung 38 both illustrate bronchi 40 and air sacs 42. The model of a lung 14 is used to demonstrate the relationship of the lungs to the body and to visually demonstrate the contrast between a healthy lung 36 and an unhealthy lung 38. The unhealthy lung 38 may represent inflamed airways, swelling, bronchoconstriction, or any other lung affliction.

FIG. 5 illustrates the healthy lung 36 and unhealthy lung 38 containing an internal pouch 44 for housing the removable inflatable airways 16 representing miniature bronchioles and a cord 46 wrapped around the inflatable airways 16 to represent smooth muscle tissue.

The inflatable airways 16 are stored in a collapsed condition in the pouches 44 of the healthy and unhealthy lungs 36, 38 when the medical training manikin 10 is not in use. When in use, each inflatable airway 16 is removed from the pouch 44 and suitably inflated.

The inflatable airway 16 representing the bronchiole of the healthy lung 36 includes a transparent tube to function as a miniature blood pressure cuff. When used for a patient demonstration, the inflatable airway 16 is removed from the pouch 44 of the healthy lung 36 and inflated by squeezing a hand-operated pump 48 connected to the inflatable airway 16 by a conduit 50 until the inflatable airway 16 is patent. The patent inflatable airway 16 is then locked via a valve 52 in the hand-operated pump to prevent occlusion.

The inflatable airway 16 representing the bronchiole of the unhealthy lung 38 may be typically red in color. The hand-operated pump 48 associated with the unhealthy lung 38 may have a valve 52 which is not to be engaged during a patient demonstration. Alternatively, the hand-operated pump 48 associated with the unhealthy lung 38 may not have a valve 52. When inflated, the inflatable airway 16 of the unhealthy lung 38 swells causing occlusion.

To further illustrate unhealthy lung conditions, a yellow-green material representing mucus may be added to the inside of the inflatable airway 16 of the unhealthy lung 38 to assist in demonstrating to a patient mucus accumulation and the relation to symptoms and medication. Also, a device may be added to the manikin to audibly demonstrate wheezing to represent constriction of the air flow through the lung and to assist the patient in understanding the nature of airway inflammation and bronchoconstriction.

The cord 46 representing smooth muscle tissue is loosely wrapped in a helical pattern around the inflatable airway 16 of the healthy and unhealthy lungs 36, 38. Each cord 46 is knotted at the terminal ends thereof to prevent constriction of each inflatable airway 16. The cord 46 wrapped around the unhealthy lung 38 may be pulled taut to show bronchoconstriction.

A typical medical training manikin 10 as illustrated in FIGS. 1-5 may be approximately three feet in length and constructed of durable lightweight substituents. The exact size, materials of construction, and weight of the medical training manikin 10 is such that it is readily portable. The fabric coverings shown in FIGS. 1-5 are made of a fabric but may be a transparency, appliqué, or any other suitable material covering to represent the desired body part or organ.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A medical training manikin comprising:
    a body;
    a model of a lung including inflatable airways for attachment to the body wherein each of the inflatable airways has a cord wrapped around it to represent smooth muscle tissue; and
    fastener means for selectively attaching the model of a lung to the body.

2. The training manikin as defined in claim 1, wherein the fastener means includes a hook and loop fastener.

3. The training manikin as defined in claim 1, wherein the fastener includes a snap-type fastener.

4. The training manikin as defined in claim 1, further includes a head attached to the body.

5. The training manikin as defined in claim 4, further includes a face mask attachable to the head.

6. The training manikin as defined in claim 1, wherein the model of a lung includes indicia representing a healthy lung and an unhealthy lung.

7. The training manikin as defined in claim 6, including a pouch for housing the inflatable airways.

8. The training manikin as defined in claim 7, wherein the inflatable airway of the unhealthy lung contains a colored substance representing mucus.

9. The training manikin as defined in claim 1, further including means for introducing pressure fluid into the inflatable airways.

10. The training manikin as defined in claim 9, wherein the means for introducing pressure fluid into the inflatable airways includes a hand-operated pump and a conduit.

11. The training manikin as defined in claim 10, wherein the hand-operated pump includes a closing valve.

12. The training manikin as defined in claim 1, wherein the cord is adjustable.

13. The training manikin as defined in claim 1, further including a device to audibly demonstrate various breathing sounds.

14. A medical training manikin comprising:

a body;

a model of a lung including inflatable airways for attachment to the body wherein each of the inflatable airways has a cord wrapped around it to represent smooth muscle tissue;

means for introducing pressure fluid into the inflatable airways; and fastener means far selectively attaching the model of a lung to the body.

15. The training manikin as defined in claim 14, wherein the means for introducing pressure fluid into the inflatable airways includes a hand-operated pump, a conduit communicating wit the inflatable airways, and a closing valve.

\* \* \* \* \*